(12) United States Patent
Belbachir et al.

(10) Patent No.: US 7,094,823 B2
(45) Date of Patent: Aug. 22, 2006

(54) COMPOSITION AND METHOD FOR CATALYSIS USING BENTONITES

(76) Inventors: Mohammed Belbachir, 3, Batiment B1 Cité Liobet, Av. S. Chami 31000, Oran (DZ); Abdelhak Bensaoula, 9209 Hilldale St., Houston, TX (US) 77055

( * ) Notice: Subject to any disclaimer, the term of this patent is extended or adjusted under 35 U.S.C. 154(b) by 533 days.

(21) Appl. No.: 10/264,139

(22) Filed: Oct. 3, 2002

(65) Prior Publication Data

US 2003/0069446 A1    Apr. 10, 2003

Related U.S. Application Data

(60) Continuation of application No. 09/870,093, filed on May 30, 2001, and a division of application No. 09/535,894, filed on Mar. 27, 2000, now Pat. No. 6,274,527.

(51) Int. Cl.
*C08K 3/34*    (2006.01)
(52) U.S. Cl. .................. 524/447; 526/95; 526/194; 526/226
(58) Field of Classification Search ................. 524/447; 526/95, 194, 226
See application file for complete search history.

(56) References Cited

U.S. PATENT DOCUMENTS 3,998,992 A * 12/1976 Nakamura .................. 428/451
6,274,527 B1    8/2001 Belbachir et al. ............. 502/63
6,310,154 B1 * 10/2001 Babcock et al. ............ 526/194

OTHER PUBLICATIONS

Harrane, Amine, et al., "Polymerization of ε-caprolactone using a montmorillonite clay as catalyst," *Designed Monomers and Polymers*, vol. 8, No. 1, pp. 11-24 (2005).
Harrane, Amine, et al., "Synthesis of Biodegradable Diblock Copolymers of Glycolide and Poly(oxyethylene) Using a Montmorillonite Clay as Catalyst," *J. Polymer R.* (2005) 12: 367-371.
Hachemaoui, Aïcha,, et al., "Ring-opening polymerization of lactones catalyzed by ion-exchanged clay montmorillonite and the application to well-defined block copolymer synthesis with seven-membered cyclic carbonate," *Mat. Lett.* 59 (2005) 3904-08.
Harrane, Amine, et al., "Cationic Ring Opening Polymerization of Glycolide Catalysed by a Montmorillonite Clay Catalyst," *J. Polymer R.* (2005) 12: 361-365.

Hachemaoui, Aïcha, et al., "Montmorillonite clay-catalysed synthesis of cyclic allylamines," *Mendeleev Commun.*, 2005.
Yahiaoui, Ahmed, et al., "Synthesis and structural analyses of poly (1, 2-cyclohexene oxide) over solid acid calyst," *Mat. Lett.* 59 (2005) 759-767.
Harrane, Amine, et al., "A Protons Exchanged Montmorillonite Clay as an Efficient Catalyst for the Reaction of Isobutylene Polymerization," *Int. J. Mol. Sci.*, 2002.
Meghabar, R., et al., "Maghnite-H$^+$, an ecocatalyst for cationic polymerization of N-vinyl-2-pyrrolidone," *Polymer* 44 (2003) 4097-4100).
Breen, Christopher, et al., Characterisation of Moderately Acid-treated, Size-fractionated Montmorillonites using IR and MAS NMR Spectroscopy and Thermal Analysis, *J. Mater. Chem.*, 1995, 5(3), 469-474.
Breen, Christopher, et al., "Characterization and Catalytic Activity of Acid-Treated, Size-Fractionated Smectites," *J. Phys. Chem. B* 1997, 101, 5324-5331.
Yahiaoui, Ahmed, et al., "An Acid Exchanged Montmorillonite Clay-Catalyzed Synthesis of Polyepichlorhydrin," *Int. J. Mol. Sci.* 2003, 4, 548-561.
Odian, George, *Principles of Polymerization*, 1991, 3d Edition, pp. 199-205.
Odian, George, "La Polymerisation: Principes et Applications," Polytechnica, p. 222-226, 1994.
Hachemaoui, Aïcha, et al., "Acid Exchanged Montmorillonite Catalyzed Condensation Reaction of Fluoroalkyliodide onto Amines," *Asian Journal of Chemistry*, vol. 17, No. 2, 755-766, 2005.
Ferrahi, Mohammed Issam, et al., "Synthesis of Cyclic Polyesters of Poly(Oxybutylene Oxymaleoyl)," *J. Polymer R.* (2005) 12: 167-171.

* cited by examiner

*Primary Examiner*—Edward J. Cain
(74) *Attorney, Agent, or Firm*—Baker Botts L.L.P.

(57) ABSTRACT

Maghnia or Mostaganem bentonites, are activated by contacting the Maghnia or Mostaganem bentonite with an acid solution of selected concentration and then drying the Maghnia or Mostaganem bentonite to form an activated bentonite catalyst. This activated bentonite catalyst may be used to polymerize a vinyl, acrylic, cyclic ether, aldehyde, lactone or olefin monomer. In a further embodiment, a perflourinated amine or diamine is synthesized by contacting a Maghnia or Mostaganem bentonite with an acid solution of selected concentration, drying the Maghnia or Mostaganem bentonite, and absorbing a secondary amine with the Maghnia or Mostaganem bentonite to form a perflouroamide iodide salt. The perflouramide idodide salt can then be extracted with a polar solvent and neutralized by the use of a basic solution.

13 Claims, No Drawings

US 7,094,823 B2

COMPOSITION AND METHOD FOR CATALYSIS USING BENTONITES

This application is a divisional application of U.S. Ser. No. 09/535,894 filed Mar. 27, 2000 now U.S. Pat. No. 6,274,527 B1 and a continuation of copending application U.S. Ser. No. 09/870,093, filed May 30, 2001.

TECHNICAL FIELD OF THE INVENTION

The present invention relates in general to the polymerization of certain monomers and more specifically to the use of Maghnia and Mostaganem bentonites as catalysts for polymerization.

BACKGROUND OF THE INVENTION

The present field of polymerization of monomers is varied in types of monomers, catalysts, and processes. Often, catalysts used to make polymers are expensive, may be poisoned by products of the reaction or impurities present in the monomer feed, and contain heavy metals such as chromium, mercury and cadmium that present environmental disposal problems for users. Frequently, these catalysts require the use of very high or very low temperatures and high pressures during the polymerization reaction. Separation of the catalyst from the polymer is not always possible, making the polymer less desirable for the customer.

Examples of these problems are found in the polymerization of tetrahydrofuran (THF) and dioxalane (DXL). The cationic polymerization of THF is now mostly catalyzed with a $BF_3/FSO_3H/HClO_4$ mixture, or oleum. This reaction requires a promoter, typically an olefin oxide, acetyl chloride, acetic anhydride or cetene. Because of the inefficiency of the catalyst, large amounts of the catalyst and promoter are required, up to one mole of catalyst for one mole of polytetrahydrofuran (PTHF), resulting in a very expensive process. Similarly, DXL is most often polymerized using a $BF_3/FSO_3H$ mixture in the presence of dichloromethane in a nitrogen atmosphere. However, the reaction is not continuous, the yield is poor, and purification of the product from the residual $BF_3$ is difficult. As a result of these problems, polydioxolane is not manufactured on an industrial scale.

The chemical industry is always looking for new substitutes to these classical catalysts. For instance, PTHF can now be polymerized in a cost-effective and environmentally appropriate manner using antimony pentachloride as a catalyst and a mixture of carboxylic anhydrides in the presence of alcohol as a promoter. But while this new manner of catalysis has alleviated some of the processing problems, it has resulted in a polymer that, because of its black color, does not meet industry needs.

In addition, toxic catalysts often present problems in the manufacture of polymers used in medical and veterinary procedures. Those installing these polymers often desire that the polymer be metabolized by the body after the polymer has performed its function. These types of polymers are called "bioresorbable." Many bioresorbable polymers are synthesized from lactides. These bioresorbable polymers are frequently used for suture strings, suture wire, staples, meshes, and hemostatic clamps. The polylactide are synthesized with the use of catalysts, most often a trioxide of antimony and stannous octanoate. These catalysts are toxic in even trace amounts, necessitating a careful and costly separation of the catalyst from the polymer.

SUMMARY OF THE INVENTION

Accordingly, there is a need for an effective, low-operating-cost, environmentally-appropriate method of polymerizing certain monomers. We have found that activated Algerian bentonites, particularly those from Maghnia or Mostaganem, at temperatures between 0° and 80° C. are capable of catalyzing the polymerization of these monomers. The bentonite catalyst is activated by contacting a Maghnia or Mostaganem bentonite with an acid solution of selected concentration and then drying the Maghnia or Mostaganem bentonite.

In another embodiment of the invention, a vinyl, acrylic, cyclic ether, aldehyde, lactone or olefin monomer is polymerized by contacting a Maghnia or Mostaganem bentonite with an acid solution of selected concentration, drying the Maghnia or Mostaganem bentonite and then contacting the vinyl, acrylic, cyclic ether, aldehyde, lactone, or olefin monomer with the Maghnia or Mostaganem bentonite.

In another embodiment of the invention, a polymer is manufactured by contacting a Maghnia or Mostaganem bentonite with an acid solution of selected concentration, then drying the Maghnia or Mostaganem bentonite and contacting a vinyl, cyclic ether, aldehyde, lactone, acrylic or olefin monomer with the Maghnia or Mostaganem bentonite.

In a further embodiment of the invention, a perflourinated amine or diamine is synthesized by contacting a Maghnia or Mostaganem bentonite with an acid solution of selected concentration, drying the Maghnia or Mostaganem bentonite, and adsorbing a secondary amine with the Maghnia or Mostaganem bentonite to form a perflouroamide iodide salt. The perflouramide idodide salt can then be extracted with a polar solvent and neutralized by the use of a basic solution.

One advantage of the present invention is that the Maghnia or Mostaganem bentonite can be easily activated with a variety of mineral or organic acids, at room temperature or under heat with a simple procedure. As another advantage, these catalysts can then initiate polymerization and copolymerization reactions at relatively low temperatures. As a further advantage, the catalysts can be regenerated easily, requiring only heating to a temperature above 100° C. As an additional advantage, the catalysts can be easily separated from the polymer product for reuse, reducing operating costs as well as disposal costs.

DETAILED DESCRIPTION OF THE INVENTION

Bentonites are hydrated aluminosilicates which crystallize in layers. These bentonites occur naturally and are mined by the National Company of Non-Ferreous Products (Enterprise Nationale des produits non ferreux, ENOF). After crushing, bentonites can be sold under the name of "load bentonite." Once crushed, activated in hot sulfuric acid (32%–38% in weight), dried, ground, sifted and conditioned, bentonites are commercialized under the name of "bleaching clay." Bentonites are often used to filter cooking, mineral, and organic oils. When added to calcium carbonates, but not acid-treated, bentonites are used for oil drilling under the name of "drilling bentonite." Bentonites are often utilized as bleaching clays for oils, drilling mud for oil drilling, as stabilizer for paints and rubbers, and as insulators for foundries. However, use of bentonites as catalysts is very new, and research and patenting has been limited to bentonites found in the United States, with focus on those found in Wyoming and Texas. The Algerian bentonites do not have the same physical and chemical structure as the American bentonites and prior to this invention, were never tested for their catalytic properties. FIG. 1 is a comparison of the composition of American, French and Maghnia Algerian bentonites.

FIG. 1
Comparison of the Composition (in %) of American, French, and Maghnia Algerian Bentonites
(Prior to Treatment)

|  | Wyoming (USA) | Vienne (France) | Maghnia (Algeria) | Maghnia (Algeria) |
|---|---|---|---|---|
| SiO2 | 57.4 | 50.04 | 69.39 | 71.7 |
| Al2O3 | 20.27 | 20.16 | 14.67 | 14.03 |
| Fe2O3 | 2.92 | 0.68 | 1.16 | 0.71 |
| FeO | 0.19 | 9 | | |
| CaO | 0.23 | 1.46 | 0.3 | 0.28 |
| MgO | 3.13 | .23 | 1.07 | 0.8 |
| K2O | 0.28 | 1.27 | 0.79 | 0.77 |
| Na2O | 1.32 | trace | 0.5 | 0.21 |
| TiO2 | 0.12 | | 0.16 | 0.15 |
| SO3 | | | 0.91 | 0.34 |
| As | | | 0.05 | 0.01 |
| Organics/Water | | | 11 | 11 |
| H2O | 6.85 | 26 | | |

Bentonite from Maghnia has 11.9% more $SiO_2$ than that from Wyoming and 19.35% more than from Montmorillon (Vienne, France). When treated with sulfuric acid, this difference is even greater: 14.21% and 21.66% as compared to Wyoming and Vienne bentonites, respectively.

Bentonite from Maghnia contains 5.60% and 5.49% less $Al_2O_3$ than the Wyoming and Vienne bentonites, respectively. Once treated, this difference is 6.24% and 6.13% with respect to the Wyoming and Vienne bentonites, respectively. The X-ray diffraction spectra from the 3 bentonites are comparable except the peak intensities and the width of the interlayer spacing which varies with the chemical composition. However, bands at 3.76, 3.05, 2.97, 2.12, 1.83 Å observed in the spectrum of the Wyoming bentonite are not present in the spectrum of the bentonite from Maghnia. The same main IR bands are observed in the bentonites from Texas, Wyoming, and Maghnia with some variations. However, the bands at 885 $cm^{-1}$ and 780 $cm^{-1}$ are absent in the IR spectrum of the Maghnia bentonite. There are also differences in the NMR spectra: Si NMR: The relative intensity of the peak at 93.5 ppm is higher for the Maghnia bentonite as compared to that of Wyoming and Vienne. Al NMR: The peaks at 68, 60, and 2.9 ppm are higher for the Maghnia bentonite. Once treated, the spectrum of the bentonite from Maghnia shows a higher peak at 2.88 ppm, which is a characteristic of the $Al^{3+}$ mobile cations in the interlayer space. When the Maghnia bentonite is exchanged with Ca, there is a slight shift of the octahedral sites and of the 1 and 2 tetrahedral sites.

In the present invention, Algerian bentonites from Maghnia or Mostaganem are used as catalysts for the polymerization of certain monomers, namely cyclic ethers, lactones, olefins, and monomers with vinyl or acrylic groups. Prior to use as a catalyst, bentonites must be activated with an organic or mineral acid in a selected concentration. This concentration can be determined by one who is skilled in the art without undue experimentation. An example demonstrating this process of activation is disclosed in Example 1.

EXAMPLE 1

Bentonite from Maghnia (20 g) was crushed for 15 minutes using a Prolabo ceramic balls grinder. It was then dried by baking at 105° C. for 2 hours. The bentonite was then weighed and placed in an Erlenmeyer flask together with 500 ml of distilled water. The bentonite/water mixture was stirred using a magnetic stirrer and combined with 40 ml of sulfuric acid. Stirring was stopped and the sulfuric acid/bentonite solution was allowed to sit for 3 days, following which it was filtered through the use of filter paper. The resulting solid was washed with distilled water, weighed again, and then dried at 150° C. The resulting activated bentonite catalyst was then stored in a hermetically sealed container.

The above process for activating a bentonite catalyst may be altered by stirring the sulfuric acid/bentonite solution, reducing the treatment time from 3 days to 12 hours. We have also found that by refluxing the sulfuric acid/bentonite solution while stirring, the treatment time could be reduced to as little as 2 hours. The concentration of the sulfuric acid should preferably be between 0.1 and 0.9M. Concentrations above 1M may deactivate the catalytic properties of the bentonite. The optimal concentration of sulfuric acid for the polymerization of THF and 1,3 dioxolane (examples below) is 0.23M, where conversion rates were optimized.

Other mineral and organic acids may be used to activate the bentonite catalyst. Examples of these include nitric acid, chloric acid, flouric acid, propionic acid, butyric acid, and acrylic acid. Other acids and the appropriate concentrations can be determined by those of ordinary skill in the art.

The monomer can be used as is or can be pretreated by a bentonite from Maghnia or Mostaganem. This pretreatment allows for elimination of the impurities in the monomer, such as water. An example of this treatment is contained in Example 2.

EXAMPLE 2

Commercial grade THF was analyzed by vapor phase chromatography and found to contain 7% of impurities and water. Activated bentonite was then added to the commercial grade THF in a 0.5:100 activated bentonite to commercial grade THF ratio. The resulting solution was then boiled for two hours. The THF was filtered from the resulting solution, dried on magnesium sulfate ($MgSO_4$) to remove any trace of water and then tested for impurities using gas phase chromatograph. Fewer impurities were found.

The pretreatment step may also be performed within a nitrogen or argon atmosphere for a further reduction in water in the monomer. This pretreatment step may also be used on other monomers and solvents prior to use in the polymerization reaction with bentonites.

The activated bentonite catalyst may be used to polymerize a variety of monomers. Examples of several monomers that may be polymerized are illustrated in the following examples. Variations in reaction conditions and additives will result in differences from the examples below. For instance, the use of solvents slows down the reaction rate. The temperature influences the polymer molecular weight and its degree of polymerization and polymolecularity (poly-dispersion rate). Higher temperatures will result in a lower molecular weight. For instance, for PTHF, the increase in temperature from 30° to 40° C. will result in a decrease in molecular weight from 4900 to 2400. Higher temperatures will increase the reaction rate. The reactions will generally function between the temperatures of −100°

C. and 100° C. Stirring has an important effect. With no stirring, the reaction yields polymers that have higher molecular weights and higher poly-dispersion rates. With stirring, polymers are produced with lower molecular weights but with a polydispersity rate of between 1 and 3.

Prompt separation of the reaction products from the activated bentonite catalyst is preferred. Continued contact between the actual bentonite catalyst and the polymer will result in depolymerization.

Concentrations are indicated in weight and in percent with respect to weight. Examples 1 through 6 are homopolymers of cyclic ethers.

EXAMPLE 3

Polymerization of THF

A condenser filled with argon and a magnetic stirrer was mounted on a 250 ml three-neck flask. The following reagents were then introduced in the flask: 84.13 g (1.66 mmole) of commercial grade THF, 14.02 g (0.137 mmol) of acetic anhydride and 1.99 g of activated bentonite. The reaction was performed while stirring using the magnetic stirrer and at room temperature. The reaction was stopped after 6 hours. The catalyst was then removed through filtration. Remaining THF monomer and acetic anhydride were then evaporated. The polymer was precipitated in cold methanol, dried and weighed (78.5 g). The compound was yellow to brown. The poly-THF (PTHF) was analyzed using $^1$H NMR (Bruker 200 MHZ) using $CHCl_3$ as solvent and TMS as reference. The chemical shifts of the various groups were found to be: $(CH_2)2$-$CH_2$-:1.5 (ppm) and —$CH_2C$ $H_2O$-:3.2 (ppm). The molecular weight values were determined using vapor phase chromatography, calibrated with polystyrene in THF, and found to be: $M_{pic}$=7976.4, $M_w$=8748.9; $M_n$=6506.2. The polydispersity index ($M_w/M_n$) was calculated as 1.3.

EXAMPLE 3A

The experiment in Example 3 was repeated using THF pretreated in accordance with the procedure demonstrated in Example 2. The PTHF produced by the reaction was white instead of yellow to brown. The NMR measurement gave the same chemical shift as shown in Example 3. The molecular weight values were again determined by vapor phase chromatography and found to be: $M_{pic}$=8377.4; $M_w$=9430.1; $M_n$=6537.4. The polydispersity index ($M_w/M_n$) was calculated as 1.4.

EXAMPLE 3B

The experiment in Example 3A was repeated but the acetic anhydride was omitted. No polymerization reaction was observed.

EXAMPLE 3C

The experiment in Example 3 was repeated, except that dichloromethane was added as a solvent. The PTHF was analyzed using NMR and its molecular weight was determined with vapor phase chromatography and found to be: Molecular weight=7144.4; $M_w$=8436; $M_n$=6501.1. The polydispersity index ($M_w/M_n$) was calculated as 1.29.

EXAMPLE 3D

The experiment in Example 3 was repeated except that the magnetic stirrer was omitted. The polymer was analyzed using NMR and its molecular weight values were determined using vapor phase chromatography. The values were: Molecular weight=6810.0; $M_w$=8772.3; $M_n$=6471.4 and the polydispersity index ($M_w/M_n$) was calculated as 1.29.

It is apparent from these experiments that stirring, the use of a solvent, temperature and reaction duration influence the molecular weight and the degree of polymerization (polymolecularity ratio). The reaction temperature and the amount of the activated bentonite catalyst determine the length of the PTHF chains, from $M_n$=200 to $M_n$=10000. Further, high temperature during the reaction results in a risk of reticulation or depolymerization of the acrylic or methacrylic macromonomers.

The polymers that result from Examples 3–3D are telechelics. They have a double bond at the end of each chain. This bond position allows use of the PTHF as a non-toxic softening agent in the synthesis of various polymers, which are biocompatible and/or biodegradable. Further, the reaction in Examples 3–3D occurs in a single step in contrast to current methods, which require many steps including polymerization of the THF and fixation of polymer groups at the end of the chains. The bentonite catalyst does not require an organic solvent and is non-toxic.

EXAMPLE 4

Polymerization of 1,3-dioxolane

A magnetic stirrer was placed in a 250 ml Erlenmeyer flask with an air atmosphere. While continuously stirring with the magnetic stirrer, 500 mg of activated bentonite catalyst and 50 g of 1,3-dioxolane were combined in the 250 ml Erlenmeyer flask. The reaction began three minutes after combining the two reagents and was violent. The stirring was stopped and the reagents allowed to sit for 10 hours. The reaction products were dissolved in dichloromethane and the bentonite catalyst removed by filtering the solution through filter paper. The solution was then baked under vacuum at 25° C. After 4 hours, the polydioxolane (PDXL) polymer was weighed (48.8 g) and analyzed using NMR and vapor phase chromatography, calibrated with polyoxyethylene. The Molecular weight=8053.5, $M_w$=12469.9, $M_n$=3111.5 and the polydispersity index ($M_w/M_n$) was calculated as 3.97.

EXAMPLE 4A

The experiment in Example 4 was repeated with dichloromethane as a solvent. The reaction was stopped after 2 hours, and the solvent was evaporated under vacuum. The PDXL was then dried as in example 4 and analyzed by NMR and vapor phase chromatography. The Molecular weight=7976.4, Mw=8748.9, Mn=6506.2 and the polydispersity index ($M_w/M_n$) was calculated as 1.3.

The reactions described in Examples 4 and 4A are temperature sensitive. Reactions at temperatures below 0° C. yield a high $M_n$ ($M_n$>56,000). The $M_n$ drops as the temperature increases above 0° C. The amount of catalyst also drives the resulting $M_n$. $M_n$ increases linearly with the catalyst concentration up to a critical value, 5% of catalyst concentration. Beyond such a value $M_n$ does not vary and depolymerization may result. If a solvent such as dichloromethane is added to the solution there is a noticeable depolymerization rate.

EXAMPLE 5

Polymerization of Epichlorohydrin

A magnetic stirrer was placed in a 250 ml Erlenmeyer flask with an air atmosphere. While continuously stirring with the magnetic stirrer, 100 mg of activated bentonite catalyst and 10 g of epichlorohydrin were combined in the 250 ml Erlenmeyer flask. The reaction was immediate and violent and resulted in a black product. The product was dissolved in chloroform, and passed through an activated carbon bed. The bentonite catalyst was filtered, resulting in a yellow solution. The solvent was then evaporated and a highly viscous polymer remained. The poly-epichlorohydrin was then weighed (9.3 g). The poly-epichlorohydrin was then analyzed by NMR resulting in a single peak at 3.76 PPM and the molecular weight of the polymer was determined to be 654 by viscometry (capillary viscometer SEMATECH) at 25° C. in chloroform. $M_v$ was 654; $M_n$=726; $M_w$=2046. After precipitation in methane, $M_n$=3450; $M_w$=5390.

EXAMPLE 5A

The experiment in Example 5 was repeated using epichlorohydrin pretreated in accordance with the procedure demonstrated in Example 2. The chemical shifts were identical to those obtained in Example 5. The molecular weight was determined by viscometry to be 865.

EXAMPLE 6

Polymerization of 1,2-epoxypropane

A magnetic stirrer was placed in a glass-stoppered 100 ml Erlenmeyer flask with an air atmosphere. While continuously stirring with the magnetic stirrer, 100 mg of activated bentonite catalyst and 5 g of 1,2-epoxypropane were combined in the 100 ml Erlenmeyer flask. As soon as the two reagents were added, a violent reaction resulted, heat was released, and the solution turned black. Chloroform and vegetal carbon were added to remove impurities resulting from reaction. After stirring the solution was passed through filter paper to remove the bentonite catalyst. The chloroform was then evaporated in low vacuum to extract the poly-1, 2-epoxypropane. The resulting polymer was weighed (3.9 g) and then analyzed using NMR. NMR results were a $CH_3$ (doublet) at 5.1 ppm and —$CH_2$ and —CH—O—(multiplet) at 3.2–3.8 ppm. $M_v$ was 520 (viscometric value). Viscometry measured a molecular weight of 420 for the poly-1,2 -epoxypropane.

EXPERIMENT 6A

The experiment in Example 6 was repeated using 1,2-epoxypropane pretreated in accordance with the procedure demonstrated in Example 2. The poly-1,2-epoxypropane was analyzed using NMR and its molecular weight was determined by viscometry to be 640.

One of ordinary skill in the art will recognize that other monomers such as ethylene oxide, oxetane, 1,3 dioxepane, 1,3 dioxocane, and their substitutents; lactams including 3-propanolactam; 4-butanolactam; 5-pentanolactame and 6-hexanolactam; lactones including caprolactone, and valerolactone; aldehydes including acetaldehyde, propionaldehyde and butyraldehyde; and non-cyclic ethers including chloroethyl vinyl ether, butyl vinyl ether and ethyl vinyl ether may be used in a manner similar to that shown above.

Example 7 is an experiment showing the use of the Maghnia or Mostaganem bentonite to form a copolymer of two cyclic ethers.

EXAMPLE 7

Copolymerization of 1,3-dioxolane and 1,3,5 trioxane

A magnetic stirrer was placed in a 100 ml Erlenmeyer flask with an air atmosphere. While continuously stirring with the magnetic stirrer, 5 g of 1,3-dioxolane and 5 g of 1,3,5 trioxane were mixed in a 100 ml Erlenmeyer flask. 100 mg of activated bentonite catalyst was then added to the mixture. The reaction was then allowed to proceed for 2 hours while constantly stirring. The bentonite catalyst was extracted from the reaction solution by filtration with filter paper and chloroform, which was evaporated under vacuum. The copolymer of 1,3-dioxolane and 1,3,5 trioxane was weighed (7.2 g) and then analyzed. All the chemical shifts agree with those reported in the literature. The molecular weight was determined by viscometry in THF at 25° C. to be 830.

One of ordinary skill in the art will recognize that other monomers such as butadiene, divinyl benzene and other monomers with two conjugated double bonds may be used in a manner similar to that shown above.

In a manner similar to that shown above for the polymerization of cyclic ethers, the activated bentonite catalyst can be used to react toxic substances such as dioxin and its derivatives to form non-toxic compounds. A series of examples of this process are shown in Example 8.

EXAMPLE 8

Gaseous $NH_3$ was incorporated into the bentonite catalyst. Dioxane was added to the gaseous NH/bentonite catalyst mixture for two hours. The resulting product was extracted from the bentonite catalyst and found to have one or more of the oxygen atoms on the carbon/oxygen ring substituted by nitrogen atoms to form morpholine (where one oxygen atom was substituted) and piperazine (where both oxygen atoms were substituted).

EXAMPLE 8A

A chlorinated aromatic molecule was added to a treated bentonite catalyst, which had been previously reacted with an amine. The resulting reaction was carried out at 30° C. The reaction product was then extracted with cholorform.

Derivatives of dioxin, DDT and PCB's may be reacted in much the same way as examples 8 and 8A to form non-toxic reaction products.

Example 9 is an experiment showing the use of the Maghnia or Mostaganem bentonite to polymerize styrene, a monomer having a vinyl group.

EXAMPLE 9

Polymerization of Styrene

A magnetic stirrer was placed in a glass-stoppered 10 ml Erlenmeyer flask with an air atmosphere. While continuously stirring with the magnetic stirrer, 100 mg of activated bentonite catalyst and 10 g of styrene were combined in the 100 ml Erlenmeyer flask. The reaction was exothermic and resulted in a solution that became solid with a slightly yellowish color. The polystyrene was then dissolved in chloroform and the bentonite catalyst recovered by filtration. The chloroform was evaporated under vacuum, leaving the polystyrene. The polymer was characterized by NMR $^1$H, GPC and DSC. The conversion rate is approximately 80%. The derivative monomers of styrene have essentially the same behavior.

One of ordinary skill in the art will recognize that other monomers with vinyl groups such as styrene derivatives, vinyl ethers and divinylbenzene may be used in a manner similar to that shown above. $M_n$ increases for low temperatures (close to 0° C.) and decreases for higher temperatures (>50° C.). An increase in the activated bentonite catalyst concentration favors the creation of higher $M_n$ up to a critical concentration of 5% of catalyst with respect to molecular weight. Above that value the $M_n$ is stable.

The polystyrene polymers obtained have a glass temperature (vitrification) ($T_g$) that increase with $M_n$. The $T_g$'s vary from 80° C. to 125° C. The polystyrene produced by the bentonite catalysts have a syndiotactic structure. The method described above for polymerizing polystyrene is an improvement over the current methods in terms of both cost and ease of operation. Current methods use $CH_2Cl_2$ at −80° C. and require $BF_3$ or triflic acid for polymerization of styrene.

EXAMPLE 10

Polymerization of Isobutylene

The un-activated bentonite catalyst was dried under vacuum. Isobutylene was then condensed at low temperatures in the reactor. The reaction was initiated using mechanical agitation. After approximately 4 hours, an oily mixture was collected. NMR analysis of this mixture revealed that the oily mixture contained a telechelic oligomer of isobutylene.

EXAMPLE 10A

The experiment in example 10 was repeated, but by first adding a solvent to the isobutylene and then agitating the mixture. The conversion rate is higher than in Example 10, 83% with a solvent, 10% without a solvent at 10° C., with a reaction duration of 3 hours and 30 minutes.

The results of Examples 10 and 10A may be altered by changing either the temperature or catalyst content. The high temperature limit is fixed by the stability of isobutylene. Temperatures above the boiling point of about −26° C. may not be used. Low temperatures yield viscous oils with much higher masses. When the amount of the activated bentonite catalyst is decreased, $M_n$ increases as well. Molecular weights also increase with the use of solvents.

One of ordinary skill in the art will recognize that other olefinic monomers such as ethylene, proplylene, normal butene and dienes such as butadiene, isoprene, and chloroprene may be used in a manner similar to that shown above.

EXAMPLE 11

Synthesis of Perflourinated Amines and Diamines

Morpholine, a secondary amine, was added to an activated bentonite catalyst and agitated. An iodoperfluoroalkyl ($CF_3$—$(CF_2)_n$—$CF_2I$) was then stirred into the mixture and was absorbed by the activated bentonite catalyst. The reaction was allowed to continue for 8 hours. The perfluouoamine iodide salt was then extracted from the activated bentonite catalyst with cholorform. The resulting product was found to have the following structure: ($CF_3$—$(CF_2)_n$—$CF_2I$)—$N^+H$—$(CH_2CH_2)_2X$, $I^+$ where X was either oxygen or NH. This product was then neutralized in a basic solution to obtain the perflourinated amine.

EXAMPLE 11A

The experiment in example 11 was repeated, but diodo perfluoralkyl ($ICF_2$—$(CF_2)_n$—$CF_2I$) and piperazine were used in place of the iodoperfluoroalkyl ($CF_3$—$(CF_2)_n$—$CF_2I$). After extraction with chloroform, a perflourinated piperazine was identified with the structure:

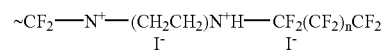

Example 12 is an experiment showing the use of Maghnia or Mostaganem bentonite to polymerize lactides into polylactides, often termed "bio-compatible polymers" for such uses as stitching for surgery.

EXAMPLE 12

The bentonite was dried under vacuum at 105° C. and then was cooled under vacuum. A cyclic lactide was then added to the dried bentonite catalyst. The dried bentonite/cyclic lactide mixture was then heated under vacuum until the mixture melted. The melting temperature was then maintained for approximately four hours, and then cooled to room temperature under vacuum. The dried bentonite catalyst/polycyclic lactide was then dissolved in a solvent. The dried bentonite catalyst was then removed by filtration and the polycyclic lactide was precipitated in a non-solvent.

Any appropriate solvent may be used to issolved the dried bentonite catalyst/polycyclic lactide. Examples include both ethyl ether and dichloromethane. Further, if desired, the need for both the solvent and the precipitating non-solvent may be forgone with separation using heating and filtration under vacuum.

Other modifications of the invention described above will be obvious to those skilled in the art, and it is intended that the scope of the claims be limited only as set forth in the appended claims.

What is claimed is:

1. A process for polymerizing vinyl, acrylic, cyclic ether, non-cyclic vinyl ether, aldehyde, lactone or olefin monomers comprising:
   contacting a Maghnia or Mostaganem bentonite with an acid solution of selected concentration;
   drying the Maghnia or Mostaganem bentonite; and
   contacting the vinyl, acrylic, cyclic ether, aldehyde, lactone, or olefin monomer with the Maghnia or Mostaganem bentonite.

2. A process in accordance with claim 1 wherein the Maghnia or Mostaganem bentonite has a $SiO_2$ concentration of greater than 65% by weight.

3. A process in accordance with claim 1 wherein prior to contacting a Maghnia or Mostaganem bentonite with an acid solution of selected concentration:

contacting the vinyl, acrylic, cyclic ether, non-cyclic vinyl ether, aldehyde, lactone or olefin monomer with a Maghnia or Mostaganem bentonite;

boiling the vinyl, cyclic ether, non-cyclic vinyl ether, aldehyde, lactone, acrylic or olefin monomer; and filtering the vinyl, cyclic ether, non-cyclic vinyl ether, aldehyde, lactone, acrylic or olefin monomer to remove the Maghnia or Mostaganem bentonite.

4. A process in accordance with claim 1 wherein after drying the Maghnia or Mostaganem bentonite and before contacting the vinyl, acrylic, cyclic ether, non-cyclic vinyl ether, aldehyde, lactone or olefin monomer with a Maghnia or Mostaganem bentonite, placing the Maghnia or Mostaganem bentonite within an argon or nitrogen atmosphere.

5. A process in accordance with claim 1 wherein the cyclic ether monomer is tetrahydrofuran.

6. A process in accordance with claim 1 wherein the cyclic ether monomer is 1,3 dioxolane.

7. A process in accordance with claim 1 wherein the cyclic ether monomer is epichlorohydrin.

8. A process in accordance with claim 1 wherein the cyclic ether monomer is 1,2 epoxypropane.

9. A process in accordance with claim 1 wherein the cyclic ether monomers are 1,3 dioxolane and 1,3,5 trioxane.

10. A process in accordance with claim 1 wherein the vinyl monomer is styrene.

11. A process in accordance with claim 1 wherein the olefin monomer is an alpha olefin.

12. A process in accordance with claim 11 wherein the alpha olefin is isobutylene.

13. A process in accordance with claim 1 wherein the olefin monomer is a diene.

* * * * *